(12) United States Patent
Rooholamini et al.

(10) Patent No.: US 7,526,570 B2
(45) Date of Patent: Apr. 28, 2009

(54) ADVANCED SWITCHING OPTIMAL UNICAST AND MULTICAST COMMUNICATION PATHS BASED ON SLS TRANSPORT PROTOCOL

(75) Inventors: Mo Rooholamini, Gilbert, AZ (US); Randeep Kapoor, Chandler, AZ (US); Ward McQueen, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 786 days.

(21) Appl. No.: 11/097,678

(22) Filed: Mar. 31, 2005

(65) Prior Publication Data

US 2006/0224813 A1   Oct. 5, 2006

(51) Int. Cl.
 *C06F 153/173* (2006.01)
(52) U.S. Cl. ............................... 709/241; 709/238
(58) Field of Classification Search ........... 709/238, 709/241; 710/316
 See application file for complete search history.

(56) References Cited

U.S. PATENT DOCUMENTS

| | | | | |
|---|---|---|---|---|
| 5,199,027 A * | 3/1993 | Barri | ............... | 370/231 |
| 5,377,327 A * | 12/1994 | Jain et al. | ............... | 709/235 |
| 6,134,218 A * | 10/2000 | Holden | ............... | 370/232 |
| 6,584,109 B1 * | 6/2003 | Feuerstraeter et al. | ............... | 370/401 |
| 6,657,964 B1 * | 12/2003 | Kohzuki et al. | ............... | 370/236.1 |
| 6,661,803 B1 * | 12/2003 | Choi et al. | ............... | 370/413 |
| 6,665,273 B1 * | 12/2003 | Goguen et al. | ............... | 370/252 |
| 6,674,904 B1 | 1/2004 | McQueen | ............... | 382/199 |
| 6,865,156 B2 * | 3/2005 | Horioka et al. | ............... | 370/236.1 |
| 6,973,504 B2 * | 12/2005 | Nomura | ............... | 709/235 |
| 6,981,054 B1 * | 12/2005 | Krishna | ............... | 709/235 |
| 7,185,123 B2 * | 2/2007 | Hofmann et al. | ............... | 710/34 |
| 7,219,183 B2 * | 5/2007 | Pettey et al. | ............... | 710/316 |
| 7,257,632 B2 * | 8/2007 | Zhang et al. | ............... | 709/226 |
| 7,320,080 B2 * | 1/2008 | Solomon et al. | ............... | 713/320 |
| 7,339,896 B2 * | 3/2008 | Ain et al. | ............... | 370/252 |
| 2002/0018477 A1 * | 2/2002 | Katz | ............... | 370/401 |
| 2004/0128410 A1 * | 7/2004 | Mayhew et al. | ............... | 710/30 |
| 2005/0044267 A1 * | 2/2005 | Dropps et al. | ............... | 709/238 |
| 2006/0004837 A1 | 1/2006 | McQueen et al. | | |
| 2006/0072615 A1 * | 4/2006 | Narad et al. | ............... | 370/474 |
| 2006/0206655 A1 * | 9/2006 | Chappell et al. | ............... | 710/315 |

OTHER PUBLICATIONS

David Mayhew, Venkata Krishnan, PCI Express and Advanced Switching: Evolutionary PAth to Building Next Generation, 2003, IEEE, StarGen Inc., pp. 1-8.*

(Continued)

*Primary Examiner*—Salad Abdullahi
*Assistant Examiner*—Anthony Mejia
(74) *Attorney, Agent, or Firm*—Marger Johnson & McCollom, P.C.

(57) ABSTRACT

An embodiment of the present invention may comprise a method to calculate current bandwidth usage by existing connections in a switching fabric between endpoints in a device, calculate available bandwidth for a new connection, and select a path from the multiple paths based on the bandwidth calculations. Some embodiments may be a device, comprising a port to connect the device to paths in an advanced switching fabric, a module to determine current bandwidth usage on the paths, calculate a cumulative bandwidth usage on the paths, calculate available bandwidth for a new connection, and select one of multiple paths available for the new connection.

26 Claims, 3 Drawing Sheets

OTHER PUBLICATIONS

Paul Liesenberg, Chris Bergen, "Switch Fabrics Create Lucrative Market to Component Vendors", Lightwave, Oct. 2000, PenWell Corporation, pp. 1-4.*
U.S. Appl. No. 10/816,253, filed Mar. 31, 2004, McQueen et al.
U.S. Appl. No. 10/982,132, filed Nov. 5, 2004, Rooholamini et al.
U.S. Appl. No. 11/096,749, filed Mar. 31, 2005, Rooholamini et al.
U.S. Appl. No. 11/097,891, filed Mar. 31, 2005, Kapoor et al.
U.S. Appl. No. 11/097,678, filed Mar. 31, 2005, Rooholamini et al.
U.S. Appl. No. 11/108,988, filed Apr. 18, 2005, Rooholamini et al.
U.S. Appl. No. 11/206,548, filed Aug. 17, 2005, Kapoor et al.
U.S. Appl. No. 11/252,158, filed Oct. 17, 2005, Rooholamini et al.
U.S. Appl. No. 11/241,798, filed Sep. 29, 2005, Rooholamini et al.

* cited by examiner

ADVANCED SWITCHING OPTIMAL UNICAST AND MULTICAST COMMUNICATION PATHS BASED ON SLS TRANSPORT PROTOCOL

BACKGROUND OF THE INVENTION

Computing technologies continue to evolve. Computing designs are incorporating more functionality, higher processing and transmission speeds, smaller sizes, more memory, etc., into smaller more robust architectures. These trends have placed demands on interconnects and data management at the device level.

A conventional interconnect technology is the peripheral component interconnect (PCI) that was initially developed for chip to chip interconnections. Previous improvements in the PCI architecture to provide greater performance have been to increase data widths and increase reference clock frequencies. For example, data widths increased from 32 bits to 64 bits and the reference clock frequency increased from 33.3 megahertz to 66.6 megahertz. Viewed on a system level, these improvements provided an interconnect with higher performance to meet the increasing performance demands brought on by other computing improvements. As architectures evolved and bottlenecks emerged, interconnect technologies have continually had to adapt to best support processing and communication with peripheral components and functionalities.

Interconnect technology has continued to evolve. The example conventional interconnect approach above, PCI, was updated with PCI Express. The changes from PCI to PCI Express represent general improvement trends in the interconnect space. For example, previous interconnect approaches shared parallel bus implementations that became a hindrance with increased reference clock frequencies. Furthermore, higher bandwidth bus segments restricted the number of loads on each segment to essentially a point-to-point interconnection. An advancement over these interconnect technologies utilizes numerous point-to-point interconnections called links, instead of the parallel bus segments. Links may consist of one or more lanes and each lane in turn generally includes a set of differentially driven pairs of bidirectional signal wires. A reduction in bus size from the shared parallel bus implementations was accompanied by incorporating some control and clocking information into the data stream instead of having separate hardware lines between devices. Adoption of this new functionality has been limited, however, and conventionally includes the integrated reference clock into communicated bit streams, addressing information and limited control information.

Interconnect architecture has received even more functionality and improvements. For example, Advanced Switching Interconnect (ASI), sometimes referred to as advanced switching, extends PCI Express functionality to support direct endpoint to endpoint communications channels via logical paths. This allows concurrent logical interconnects that each connect a specific set of resources. Furthermore, ASI can be separated into fabric specific routing and protocol specific Protocol Interfaces, allowing scaling of an ASI fabric as well as support for various protocols.

AS supports unicast (peer-to-peer or one-to-one) and multicast (one-to-many) packet transmissions. Unlike PCI Express, which follows a tree topology, ASI supports any arbitrary fabric topology. An ASI fabric may result in more than one communication path between any pair of communicating devices, known as endpoints. Selection of a path between two such devices may have a significant effect on performance. Choosing such a path may not be a straight forward task and often a simple solution will not result in a best solution. Even with recent architectural changes, conventional interconnect technologies have provided insufficient methods of determining optimal paths between communicating devices.

BRIEF DESCRIPTION OF THE DRAWINGS

Embodiments of the invention may be best understood by reading the disclosure with reference to the drawings, wherein.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description. Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Figure 1:
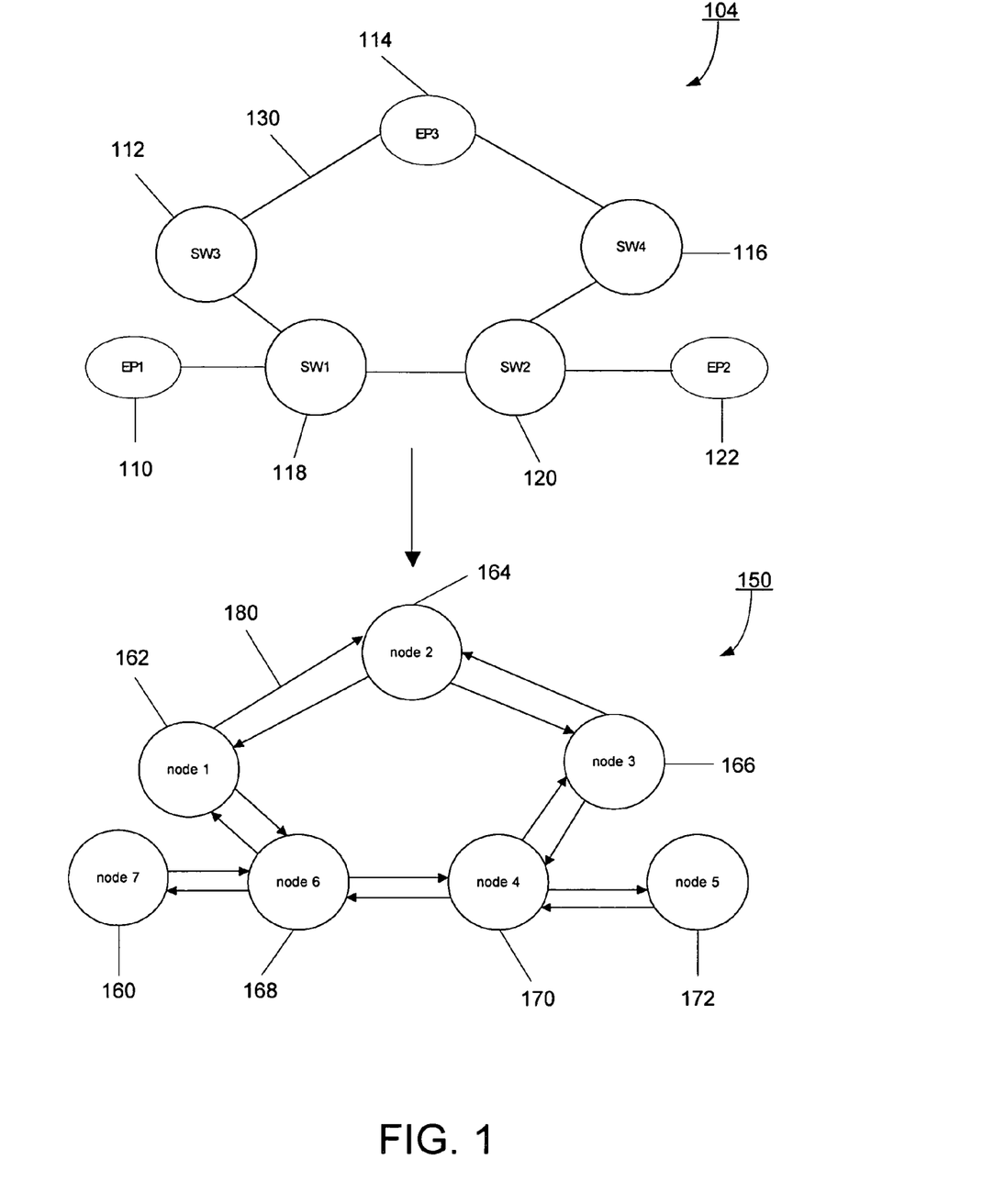
FIG. 1 illustrates an ASI fabric and a corresponding directional graph representation of that fabric.

FIG. 1 illustrates an ASI fabric 104 and a corresponding directional graph representation 100. The ASI fabric 104 in the present example includes end point 110, end point 114, and end point 122. In an embodiment an endpoint may be an ASI device that terminates a physical link at the outermost edge of an ASI fabric. In an embodiment, an ASI fabric may comprise input/output (I/O), chipsets, interconnects or other processing elements as end points and switches that are connected into a fabric over links such as examplary link 130. An ASI fabric 104 may contain switching elements 112, 116, 118 and 120. In the present embodiment, end point 110 is coupled with switch 118. Switch 118 is coupled with switch 112 and switch 120. Switch 112 may also couple with end point 114 over an exemplary link 130. In one embodiment a link may be an Advanced Switching physical interconnect between two point to point connected components. Switch 120 is coupled with switch 116 and end point 122, and end point 114 is also coupled with switch 116. In an embodiment one of the end points may be a fabric manager, for example, end point 114.

Referring to FIG. 1, the directional graph 100 includes nodes and links. Some embodiments may use Graph Theory techniques by representing the fabric with a directional graph, where nodes of the graph may represent devices (AS switches and endpoints) and edges of the graph may represent physical links between devices. Directional graph 100 therefore includes node 162 coupled over a representative link 180 to node 164. Likewise, nodes 160, 168, 170, 166 and 172 are connected in similar fashion to corresponding devices in ASI fabric 104, that is, the nodes, or ASI switches and endpoints, and the edges, representing physical links between devices, are simply a directional graph 100 representation of the corresponding ASI fabric 104.

One reason for representing an Advanced Switching Interconnect (ASI) fabric as a graph is that graph theory techniques can be applied to it, for example, to find shortest paths between devices. A graph can easily be represented in computer memory, and may therefore be processed. For example, a memory representation of graph 100 in FIG. 1 may be a two dimensional table where there is a row and a column for every node in the graph. A "1" in a table entry indicates a direct link from a node in the row entry to a node in the column entry such as from node 162 to node 164. Additionally, a value of "0" may be used to indicate there is no such link such as from node 168 to node 164.

An embodiment of the present invention may comprise a method to calculate current bandwidth usage by existing connections in a switching fabric between endpoints in a device, calculate available bandwidth for a new connection, and select a path from the multiple paths based on the bandwidth calculations. Some embodiments may be a device, comprising a port to connect the device to paths in an advanced switching fabric, a module to determine current bandwidth usage on the paths, calculate a cumulative bandwidth usage on the paths, calculate available bandwidth for a new connection, and select one of multiple paths available for the new connection.

Figure 2:
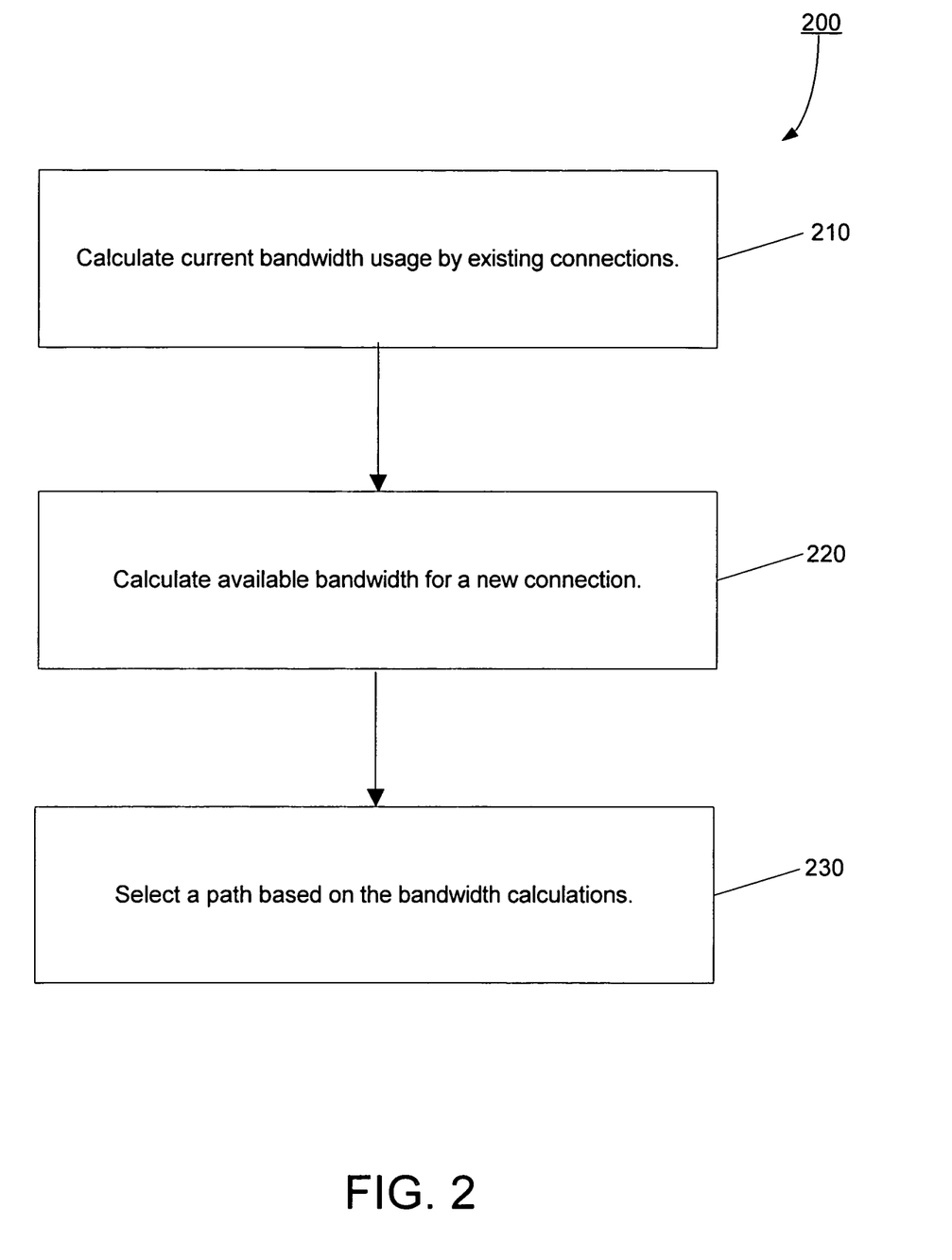
FIG. 2 illustrates a flow diagram of a method to determine or assign optimal paths between endpoints communicating in an interconnect architecture.

FIG. 2 illustrates a flow diagram of a method 200 to determine or assign optimal paths between endpoints communicating in an interconnect architecture. In block 210, a device calculates a current bandwidth usage for existing connections. In block 220, the device calculates available bandwidth for a new connection. In block 230, the device selects a path based on the bandwidth calculations. Conventional interconnect technologies, even with recent architectural advancements, have provided insufficient methods of determining optimal paths between communicating devices. Some embodiments of the present invention find an optimal path dynamically, as the fabric traffic changes, between two communicating devices that use any generic transport protocol for unicast and multicast packet transmissions.

In one embodiment, all connections may fully utilize assigned paths (i.e., bandwidth reserved) for the duration of a connection with a Maximum Packet Size (MPS) supported by the path for a Virtual Channel (VC) being used. The present embodiment is optimal for certain traffic, such as isochronous applications fully utilizing their allocated bandwidth. Other embodiments may determine optimal paths based on bandwidth usage of connections, as certain applications may not fully utilize reserved bandwidth or may use packets smaller than a supported MPS. For example, this can be accomplished by reading certain ASI Baseline Capability Counters, such as VC Transmit Dword and VC Transmit Packet Counters, to count the number of dwords, 32-bit data words, and/or number of packets transmitted for a supported VC. Additionally, if any optional ASI Statistics Counters Capability Structures are implemented, they can be used to compute a more accurate count of the current bandwidth usage and determine available bandwidth.

In an embodiment, a preferred path may be a path with maximum available bandwidth. An embodiment may run a preferred path process to determine or select the preferred path. Another embodiment may design algorithms or processes further optimized for specific transport protocols, for example, by taking into account protocol specific attributes. An embodiment may use graph theory techniques by representing a fabric with a directional graph. Therefore nodes of the graph may represent devices such as ASI switches and endpoints, and edges of the graph may represent physical links between devices. In this embodiment, a weight ("link weight"), may be dynamically computed and assigned to the edges of the graph.

In an embodiment, a link weight is calculated using a link width (LW), a maximum packet size (MPS), the number of connections (NC) using the link, an update factor (UF), and an internal delay (ID), where internal delay may be the internal processing delay for received packets. An example LW is the negotiated link width between two link partners, for example, between two advanced switching components that share a common physical link between them. A example maximum packet size may be in dwords which are 32-bit data words. In the present embodiment, the number of connections using the link may be the number of connections after or if the new connection is added. In this embodiment, the update factor may be used to balance link bandwidth efficiency and receive buffer sizes. Furthermore, this may vary according to maximum payload size of a packet and link width. In one embodiment, these values may be as defined in the PCI Express specification, *PCI Express™ Base Specification 1.0a*, Apr. 15, 2003. In an embodiment internal delay may be a substantially constant value.

An exemplary embodiment may determine weights to assign to edges of a directional graph. Once weights are assigned to edges, any shortest path algorithm, such as Dijkstra's, or other preferred path processes or algorithms, can be applied to find an optimal path. Dijkstra's algorithm is an algorithm for finding a shortest path between nodes in a graph where a node is either a vertice or an endpoint. An example Dijkstra's algorithm can construct a shortest-path tree from a node to every other node in the graph. An example optimal path would have a minimum total weight of edges on the path. An embodiment may optimize path selection for a Simple Load and Store (SLS) transport protocol to improve bandwidth allocation by taking into account SLS specific attributes.

An embodiment may be provided in a connection manager for an advanced switching fabric. Some embodiments may utilize the peer-to-peer and multicast features provided by the ASI technology. In these embodiments, since there can be multiple paths between two devices that may communicate, path selection should avoid link over/under-utilization, which can potentially lead to congestion. An embodiment of the present invention may be adaptive to fabric traffic, and avoid over-utilizing a path while other paths remain under-utilized, may load balance traffic, and can may be further optimized for any transport protocol.

Exemplary embodiments may be better understood when represented by functions. This detailed description will use the acronyms listed in the table below to functionally represent certain embodiments to aid understanding of higher level concepts.

Acronyms Used in Example Algorithm/Process
BWUn=BandWidth Usage of a link's VCn
BWAn=BandWidth Available of a link's VCn
dw=Dword
G=Giga
HDR=Header
ID=Internal Delay
LW=Link Width
LBWn=aggregated Link BandWidth for VCn
MPS=Maximum Packet Size
ms=millisecond
NC=Number of Connections
P=Period of VCn Transmit Dword Counter read
PL=PayLoad, e.g., in DWs returned in Read Response packets.

PCRC=Packet Cyclic Redundancy Check
SEQ=Sequence number in the Sequenced Write operations packets that is acknowledged
UF=UpdateFactor
VC=Virtual Channel
VCnTDC=VCn Transmit Dword Counter An embodiment may use a generic transport protocol to reserve maximum bandwidth for connections. For example, when a connection is to be established, the present embodiment may compute a current link weight for each edge of the graph as follows:

$$LinkWeight=(NC*MPS*UF/LW)+ID$$

In the present embodiment, a link weight is determined by multiplying a number of connections, such as those using a link, by a maximum packet size, and then further multiplying by an update factor as explained above. Then it may divide by a link width and add an internal delay factor to determine a link weight. In this embodiment, the more connections that go through a link, for example NC*MPS, the larger the weight of the link. Furthermore in the present example, the larger the link width, that is the more bandwidth, then the smaller the link weight. In an embodiment, the UF may increase as the LW increases, which results in larger weight.

After link weights are calculated, an embodiment may run a preferred path algorithm or process to determine the preferred path. For example, an embodiment may run Dijkstra's shortest path algorithm between the two endpoints wishing to communicate. In the present embodiment, the algorithm/process may select a path with minimum total link weights, for example, smaller weights indicate larger available bandwidth.

An embodiment may factor in current fabric bandwidth usage by existing connections and available fabric bandwidth for a new connection. To illustrate, the following embodiment uses time values in milliseconds and uses 32-bit data words. Embodiments of the present invention may use different time and data units. The present embodiment may calculate aggregated link bandwidth, LBWn, for a virtual channel, VCn, with by setting LBWn=(2.5*10−3/32)*LW (in Gdw/ms). In one embodiment, this may be done for all devices, all links, and all the supported VCs, VCn. For example, the PCI Express/AS maximum link speed supported today *LW may be set as a link's aggregate bandwidth in 1 time unit.

The present embodiment may then determine a link's maximum data rate in P time units by setting LBWn=LBWn*P. That is, an embodiment may determine the link maximum data rate in the period of a virtual channel 32-bit data word counter read by multiplying an aggregated link bandwidth for VCn by the period of the counter read.

The present embodiment may make an initial read for bandwidth usage of a link's VCn as BWUn=VCn Transmit Dword Counter register in the device's Baseline Capability. This initial read is simply an initial snapshot of the data words that have been transmitted out the specified port.

As the fabric is running, an embodiment may periodically may make reads to update variables. For example, an embodiment may, at every P time units during run of the fabric, set VCnTDC=VCn Transmit Dword Counter register in the device's baseline capability. In the present example, the smaller the period, the more accurate account of bandwidth used and available, but this results in more network traffic and more overhead.

The present embodiment may make a periodic read for bandwidth usage of a link's virtual channel, functionally this may be represented as BWUn=VCnTDC−BWUn. This calculation is the number of dwords transmitted through a link since last period or last read. The embodiment may also determine available bandwidth of a link's virtual channel with the following functional example: BWAn=LBWn−BWUn. In this case, available bandwidth is a maximum data rate in P time units minus data transferred through the link in P time units. In addition, the embodiment may set link weights with the following functional example: LinkWeightn=(MPS*UF/BWAn)+ID.

In this embodiment, after link weights are calculated, an embodiment may run a preferred path algorithm or process to determine the preferred path. For example, an embodiment may run Dijkstra's shortest path algorithm between the two endpoints wishing to communicate. In the present embodiment, the algorithm/process may select a path with minimum total link weights, for example, smaller weights indicate larger available bandwidth. Therefore, embodiments of the present invention can be implemented as part of an overall fabric management software to establish optimal paths between communicating devices. An exemplary embodiment may be a connection manager that takes advantage of unicast and multicast features of the technology of advanced switching.

Currently there is no solution that addresses connection management in AS. Some embodiments of the present invention may provide "hooks" in hardware, and may leave it up to software to utilize these features. Some embodiments may assign optimal paths to communicating devices at the interconnect level. An embodiment may provide an ASI fabric or connection management process that optimally assigns paths between ASI devices.

In yet another embodiment, a process may determine optimal unicast and multicast paths between two communicating devices using SLS transport protocol by taking into account current fabric bandwidth usage by existing connections and available fabric bandwidth for a new connection based on the SLS packet type being used for the connection. In an embodiment, a preferred path is determined with respect to a path with maximum available bandwidth.

Some embodiments may compute link weights or determine preferred paths by taking into account attributes of certain types of operations. For example, some embodiments may compute current link weights for each edge of a graph individually for posted write operations, acknowledged write operations, sequenced write operations, read-modify-write operations, and read operations as described below.

Posted write operations may be independent write transactions that do not require acknowledgement. A posted write is analogous to a simple memory write operation. In an exemplary posted write operation, a transaction source may write to a target memory and without the transaction being acknowledged. For posted write operations, an embodiment may first determine if the operation is ordered with any other type of SLS packet that uses a bypass-capable virtual channel, and if not, it uses an ordered-only virtual channel. If the operation is ordered with any other type of SLS packet that uses a bypass-capable virtual channel, the present embodiment may use an ordered queue of a bypass-capable virtual channel.

The present embodiment, for posted write operations, may set MPS=a link's MPS for the virtual channel, this makes an edge's MPS upper bounded by the link's MPS. The present embodiment may determine link weights with the above mentioned method represented functionally as linkweight= (NC*MPS*UF/LW)+ID.

An acknowledged write may be an independent write operation that requires a write response. Some embodiments may operate as described below for acknowledged write operations. For acknowledged write packets, an embodiment may use a bypass-capable virtual channel, set the maximum packet size as the maximum allowed packet size, for example in an SLS packet this would be MPS=64, and determine link weights with the above mentioned method where a linkweight=(NC*MPS*UF/LW)+ID. For unicast acknowledged write response packets, an embodiment may use an ordered queue of a bypass-capable virtual channel, set the maximum packet size equal to 16, and use the same linkweight formula (NC*MPS*UF/LW)+ID. In this embodiment, maximum packet size was determined by including a 2 data word ASI header, a 1 data word SLS header, and a 1 data word packet cyclic redundancy check. Additionally, for multicast acknowledged write response packets, and embodiment may use an ordered queue of a bypass-capable virtual channel or an ordered-only virtual channel, but set maximum packet size to 16 in similar fashion to unicast acknowledged write response packets as well as use the same linkweight formula (NC*MPS*UF/LW)+ID.

A sequenced write operation may be a dependent on a related series of write transactions and a sequenced write may consist of one or more sequenced write packets. Typically, all sequenced write operations are acknowledged by the target. Thus, sequenced write operations may consist of one or more sequenced write packets and a potentially aggregated sequenced write response. For Sequenced Write operations, the present embodiment may operate as described below.

The present embodiment, for sequenced write packets, may first consider if the sequenced write packet is not ordered with any other type of SLS packet that uses a bypass-capable virtual channel, and if so, may use an ordered-only virtual channel. Otherwise, the present embodiment may use an ordered queue of a bypass-capable virtual channel and set the maximum packet size to the link's MPS for the virtual channel. Furthermore, for sequenced write packets, the present embodiment may determine a linkweight with the formula (NC*MPS*UF/LW)+ID.

For sequenced write response packets, the present embodiment may use the same virtual channel as an associated sequenced write packet and set the maximum packet size to 20, where the MPS includes 2 data word ASI headers, 2 data word SLS headers, and 1 data word packet cyclic redundancy check. Additionally, for sequenced write response packets, the present embodiment may set a linkweight equal to ((NC*MPS*UF/LW)+ID)/SEQ, where SEQ is the sequence number in a sequenced write operation packet that is acknowledged.

A read-modify-write (RMW) operation may be an independent transaction that both reads and writes a target location. For example, a target data value prior to modification may be read and returned and the target value, if it passes the associated test, may be modified as indicated by the read-modify-write operation and written back into the target location. For RMW operations, the present embodiment may operate as follows.

For RMW packets, use a bypass-capable virtual channel. In this situation, the present embodiment may, if extended header flag is set, set maximum packet size to 32, where the maximum packet size determination includes 2 data word ASI header, 3 data word SLS header, 2 data word payload, and a 1 data word packet cyclic redundancy check. Otherwise, the present embodiment may set the MPS to 28, which is determined by a 2 data word ASI header, a 2 data word SLS header, a 2 data word payload, and a 1 data word packet cyclic redundancy check. Furthermore, linkweight may be set by the formula (NC*MPS*UF/LW)+ID.

For RMW response packets, the present embodiment may use an ordered queue of a bypass-capable virtual channel and set MPS to 24, which is determined by a 2 data word advanced switching header, a 1 data word SLS header, a 2 data word payload, and a 1 data word packet cyclic redundancy check. In this situation an embodiment may use the now familiar calculation for link weights, (NC*MPS*UF/LW)+ID.

An SLS source may send a read request packet to an SLS target and pull data from a memory or memory-like location at the target. Targets are typically required to return all read data requested by the source, unless an error is encountered. The source may then send a read request packet to the target to request data. The target returns one or more read response packets to the source with the data or error status. For these type of read operations, an embodiment may operate in the following manner.

For Read Request packets, an embodiment may use a bypass-capable virtual channel and set the maximum packet size to 28, which, as another example, may be determined by a 2 data word ASI header, a 4 data word SLS header, and a 1 data word packet cyclic redundancy check. In this situation an embodiment may determine a link weight by setting it equal to the formula (NC*MPS*UF/LW)+ID. For read response packets, the present embodiment may use the ordered queue of a bypass-capable virtual channel and set the maximum packet size to the minimum of (16+payload*4, which is essentially a 2 data word ASI header, a 1 data word SLS header, and a 1 data word packet cyclic redundancy check. This is a link's MPS for the virtual channel. In the present situation, an embodiment may set a linkweight= (NC*MPS*UF/LW)+ID.

Similar to the above embodiments, after link weights are calculated, an embodiment may run a preferred path algorithm or process to determine the preferred path. For example, an embodiment may run Dijkstra's shortest path algorithm between the two endpoints wishing to communicate. In the present embodiment, the algorithm/process may select a path with minimum total link weights, for example, smaller weights indicate larger available bandwidth.

Figure 3:
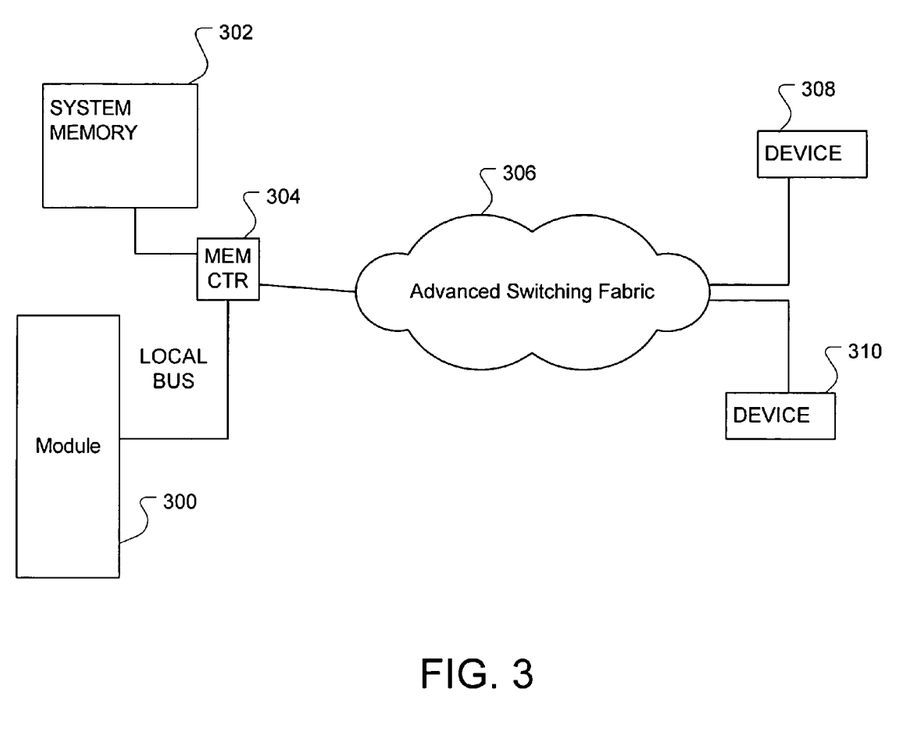
FIG. 3 illustrates an embodiment apparatus to determine advanced switching preferred unicast and multicast communication paths, for example, one based on a simple load store transport protocol.

FIG. 3 illustrates an embodiment apparatus to conduct the process as disclosed above. The device has a port to connect the device to paths in an advanced switching fabric 306, in this case the port is a memory controller 304. The device also has a module 300 to determine current bandwidth usage on the paths, calculate a cumulative bandwidth usage on the paths, calculate available bandwidth for a new connection, and select one of multiple paths available for the new connection. A module may comprise a processor, a process running on a processor, an instruction set, a controller, a chipset, an ASIC, an FPGA, etc. The subordinate devices 308 and 310 may be examples of endpoints using the switching fabric 306 to communicate with each other, the system controller 302, the memory controller 304 and the module 300. Examples of these endpoints could be expansion memory or interface cards.

The embodiment in FIG. 3 is an example of an apparatus that may execute instructions and perform processes as disclosed herein, but the invention is not so limited, any device with hardware having respective characteristics of the other examples in this description and an ability to process instructions, may satisfy the same role.

Some embodiments may comprise an article of machine-readable medium containing instructions that, when executed, cause a machine to calculate current bandwidth usage by existing connections in a switching fabric between endpoints in a device, calculate available bandwidth for a new connection, and select a path from the multiple paths based on the bandwidth calculations.

In the present embodiment, current bandwidth usage may be calculated by reading an Advanced Switching Baseline Capability Counter. In this embodiment, wherein the counter may be at least one of a 32-bit data word transmit counter and a virtual channel transmit packet counter. In some embodiments, available bandwidth may be calculated by determining an aggregated link bandwidth for a virtual channel and subtracting current bandwidth usage from the aggregated link bandwidth. In an embodiment, wherein a path may be selected by multiplying a maximum packet size by an update factor, then dividing by the available bandwidth and adding a delay factor, and running a preferred path process to select the path based on available bandwidth.

Some embodiments may further contain instructions that, when executed, cause a machine to run a preferred path process based on link weights between endpoints to determine a preferred path or to select a communication path between the endpoints based on the preferred path process.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A method comprising:
    calculating current bandwidth usage by existing connections in a switching fabric between endpoints in a device, the switching fabric comprising multiple paths;
    calculating available bandwidth for a new connection; and
    selecting a path from the multiple paths based on the available bandwidth, wherein selecting the path comprises multiplying a maximum packet size by an update factor, then dividing by the available bandwidth and adding a delay factor, and running a preferred path process to select the path based on the available bandwidth.

2. The method of claim 1, wherein calculating current bandwidth usage further comprises reading an Advanced Switching Baseline Capability Counter.

3. The method of claim 2, wherein reading an Advanced Switching Baseline Capability Counter further comprises reading a counter having at least one of a 32-bit data word transmit counter and a virtual channel transmit packet counter.

4. The method of claim 1, wherein calculating available bandwidth further comprises determining an aggregated link bandwidth for a virtual channel and subtracting current bandwidth usage from the aggregated link bandwidth.

5. The method of claim 1, wherein selecting a path further comprises selecting a path for a posted write operation, the maximum packet size being upper bounded by a maximum packet size for a link and wherein the operation uses the ordered queue of a bypass capable virtual circuit if the operation is ordered with any other type of simple load and store packet that uses a bypass capable virtual circuit.

6. The method of claim 5, wherein the maximum packet size is 64 for an acknowledged write packet, 16 for a unicast acknowledged write response packet, and 16 for a multicast acknowledged write response packet.

7. The method of claim 1, wherein selecting a path further comprises selecting a path for a sequenced write operation, the maximum packet size being upper bounded by the maximum packet size for a link and the operation uses the ordered queue of a bypass capable virtual circuit if the operation is ordered with any other type of simple load and store packet that uses a bypass capable virtual circuit.

8. The method of claim 7, further comprising using the bypass capable virtual circuit as an associated sequenced write packet and setting the maximum packet size to 20 for a sequenced write response packet.

9. The method of claim 1, wherein the maximum packet size is 32 for a read-modify-write packet if an extended header flag is set and the maximum packet size is 28 if the extended header flag is not set.

10. The method of claim 9, further comprising using a bypass capable virtual circuit.

11. The method of claim 1, further comprising using an ordered queue of a bypass capable virtual circuit and setting the maximum packet size to 24 for a read-modify-write response packet.

12. The method of claim 1, further comprising using a bypass capable virtual circuit for read request packets and setting maximum packet size to 28 and using an ordered queue of a bypass capable virtual circuit and setting the maximum packet size to the links maximum packet size for a virtual circuit for read response packets.

13. An article of machine-readable medium containing instructions that, when executed, cause a machine to:
    calculate current bandwidth usage by existing connections in a switching fabric between endpoints in a device, the switching fabric comprising multiple paths;
    calculate available bandwidth for a new connection; and
    select a path from the multiple paths based on the available bandwidth, wherein selecting the path includes multiplying a maximum packet size by an update factor, then dividing by the available bandwidth and adding a delay factor, and running a preferred path process to select the path based on the available bandwidth.

14. The article of claim 13, wherein the instructions that, when executed, cause the machine to calculate current bandwidth usage further causes the machine to read an Advanced Switching Baseline Capability Counter.

15. The article of claim 14, reading an Advanced Switching Baseline Capability Counter further comprises reading a counter having at least one of a 32-bit data word transmit counter and a virtual channel transmit packet counter.

16. The article of claim 13, wherein the instructions that, when executed, cause the machine to calculate available bandwidth further causes the machine to determine an aggregated link bandwidth for a virtual channel and subtracting current bandwidth usage from the aggregated link bandwidth.

17. An article of machine-readable medium, containing instructions that, when executed, cause a machine to:
    calculate current bandwidth usage by existing connections in a switching fabric between endpoints in a device, the switching fabric comprising multiple paths;
    calculate available bandwidth for a new connection; and
    select a path from the multiple paths based on the available bandwidth, wherein selecting the path comprises running a preferred path process based on link weights between endpoints to determine a preferred path.

18. The article of claim 17, further containing instructions that, when executed, cause a machine to select a communication path between the endpoints based on the preferred path process.

19. A device, comprising
    a module to:
        determine current bandwidth usage on multiple paths;
        calculate a cumulative bandwidth usage on the multiple paths;
        calculate available bandwidth for a new connection; and
        select one of the multiple paths available for the new connection, wherein selecting the one of the multiple paths includes multiplying a maximum packet size by an update factor, then dividing by the available bandwidth and adding a delay factor, and running a preferred path process to select the path based on the available bandwidth; and a port to connect the device to paths in an advanced switching fabric.

20. The device of claim 19, wherein the module to calculate current bandwidth usage is further to read an Advanced Switching Baseline Capability Counter.

21. The device of claim 20, wherein the module is to read a counter having at least one of a 32-bit data word counter and a virtual channel transmit packet counter.

22. The device of claim 20, wherein the module to calculate the available bandwidth is further to determine an aggregated link bandwidth for a virtual channel and subtract current bandwidth usage from the aggregated link bandwidth.

23. A system comprising:
   at least two endpoints;
   a switching fabric connecting the two endpoints, the switching fabric comprising multiple paths; and
   a module to
      determine current bandwidth usage on the multiple paths;
      calculate a cumulative bandwidth usage on the multiple paths;
      calculate available bandwidth for a new connection; and
      select one of the multiple paths available for the new connection, wherein selecting the one of the multiple paths includes multiplying a maximum packet size by an update factor, then dividing by the available bandwidth and adding a delay factor, and running a preferred path process to select the path based on the available bandwidth.

24. The system of claim 23, the switching fabric further comprising a switching fabric in accordance with the Advanced Switching standard.

25. The system of claim 23, wherein the module to calculate current bandwidth usage is further to read an Advanced Switching Baseline Capability Counter.

26. The system of claim 25, wherein the module to calculate the available bandwidth is further to determine an aggregated link bandwidth for a virtual channel and subtract current bandwidth usage from the aggregated link bandwidth.

\* \* \* \* \*

UNITED STATES PATENT AND TRADEMARK OFFICE
CERTIFICATE OF CORRECTION

PATENT NO. : 7,526,570 B2
APPLICATION NO. : 11/097678
DATED : April 28, 2009
INVENTOR(S) : Mo Rooholamini et al.

It is certified that error appears in the above-identified patent and that said Letters Patent is hereby corrected as shown below:

Column 10, line 42, the word "subtracting" should read -- subtract --.

Signed and Sealed this

Twenty-fifth Day of August, 2009

David J. Kappos
*Director of the United States Patent and Trademark Office*